(12) United States Patent
Wang et al.

(10) Patent No.: US 10,687,065 B2
(45) Date of Patent: Jun. 16, 2020

(54) IMAGE PROCESSING APPARATUS AND IMAGE PROCESSING METHOD RELATED TO MOTION COMPENSATION

(71) Applicant: MStar Semiconductor, Inc., Hsinchu Hsien (TW)

(72) Inventors: Tai-Chi Wang, Hsinchu Hsien (TW); Shu-Wei Teng, Hsinchu Hsien (TW)

(73) Assignee: MEDIATEK INC., Hsinchu (TW)

( * ) Notice: Subject to any disclaimer, the term of this patent is extended or adjusted under 35 U.S.C. 154(b) by 206 days.

(21) Appl. No.: 15/884,518

(22) Filed: Jan. 31, 2018

(65) Prior Publication Data
US 2019/0158844 A1     May 23, 2019

(30) Foreign Application Priority Data
Nov. 17, 2017   (TW) .............................. 106139902 A

(51) Int. Cl.
| | |
|---|---|
| *H04N 19/139* | (2014.01) |
| *H04N 19/176* | (2014.01) |
| *H04N 19/115* | (2014.01) |
| *H04N 19/593* | (2014.01) |
| *H04N 19/52* | (2014.01) |
| *H04N 19/43* | (2014.01) |
| *H04N 19/583* | (2014.01) |
| *H04N 19/436* | (2014.01) |
| *H04N 19/56* | (2014.01) |

(52) U.S. Cl.
CPC ......... *H04N 19/139* (2014.11); *H04N 19/115* (2014.11); *H04N 19/176* (2014.11); *H04N 19/43* (2014.11); *H04N 19/436* (2014.11); *H04N 19/52* (2014.11); *H04N 19/56* (2014.11); *H04N 19/583* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 6,748,113 B1 * | 6/2004 | Kondo ...................... | G06T 5/20 |
| | | | 375/240.23 |
| 8,000,392 B1 * | 8/2011 | Krupiczka ............. | H04N 19/56 |
| | | | 375/240.12 |
| 10,419,777 B2 * | 9/2019 | Mukherjee ........... | H04N 19/583 |

(Continued)

FOREIGN PATENT DOCUMENTS

WO     2016123081 A1     8/2016

OTHER PUBLICATIONS

TIPO Office Action, dated Oct. 5, 2018, 8 pages.

*Primary Examiner* — Iman K Kholdebarin
(74) *Attorney, Agent, or Firm* — McClure, Qualey & Rodack, LLP

(57) ABSTRACT

An image processing apparatus includes a search range providing circuit, a searching circuit and an encoder. The search range providing circuit obtains N number of predicted motion vectors for a target image block, and accordingly sets N number of corresponding search ranges in a reference frame, where N is an integer greater than 1. The searching circuit performs a motion compensation searching process individually on the N search ranges to accordingly determine a motion vector for the target image block. The encoder encodes the target image block according to the motion vector.

12 Claims, 9 Drawing Sheets

(56) References Cited

U.S. PATENT DOCUMENTS

| | | | |
|---|---|---|---|
| 2004/0223548 A1* | 11/2004 | Kato | H04N 19/172 375/240.16 |
| 2006/0083310 A1* | 4/2006 | Zhang | H04N 21/4405 375/240.16 |
| 2008/0285650 A1* | 11/2008 | Chappalli | H04N 7/0132 375/240.16 |
| 2015/0084970 A1* | 3/2015 | Schaub | H04N 19/61 345/506 |
| 2016/0219278 A1* | 7/2016 | Chen | H04N 19/56 |
| 2016/0366435 A1* | 12/2016 | Chien | H04N 19/52 |

* cited by examiner

IMAGE PROCESSING APPARATUS AND IMAGE PROCESSING METHOD RELATED TO MOTION COMPENSATION

RELATED TO MOTION COMPENSATION

This application claims the benefit of Taiwan application Serial No. 106139902, filed Nov. 17, 2017, the subject matter of which is incorporated herein by reference.

BACKGROUND OF THE INVENTION

Field of the Invention

The invention relates to an image processing technology, and more particularly to a motion compensation technology used for dynamic image encoding.

Description of the Related Art

To satisfy viewer expectations for realistic images, one main development trend of many image display apparatuses is continuing increasing the size and resolution of images. Therefore, there is a need for a solution that, while preserving good image quality, reduces the image data size through encoding technologies so as to save storage spaces as well as transmission resources.

Motion compensation is an extensively applied dynamic image encoding technology, and is based on a characteristic of high similarity between contents of two time-adjacent frames. Each frame is divided into multiple image blocks serving as a fundamental unit for encoding. For each image block to be encoded, an encoder identifies a most similar image block from a predetermined image range (to be referred to as a search range) as a reference block. A difference between coordinates of an image block to be encoded and a reference block thereof is called a motion vector, and a difference between image contents of these two image blocks is called a residual. An encoder is required to encode only the residual and the motion vector instead of on the contents of the entire image block to be encoded. The residual decreases as the similarity between an image block and a reference block thereof gets higher. It is apparent that, determining an appropriate reference block significantly helps reduce the data size of an encoding result. Therefore, selecting an appropriate search range is a critical step.

In a conventional motion compensation technology, an entire reference frame is used as a search range, and all possible motion vectors are evaluated one after another in order to identify an image block with a minimal residual data size as a reference block. However, the above approach sacrifices large amounts of computation resources and time. In view of the above, an improved solution utilizes a motion vector of an adjacent block as a predicted motion vector of an image block to be encoded to accordingly perform searching on a smaller range. Referring to FIG. 1(A), assuming that a frame 100 currently to be encoded includes an image block 111 that is to be encoded, and a reference block of an adjacent image block 110 of the image block 111 is an image block R in a reference frame 900, an encoder may use a motion vector $MV_{110}$ of the image block R with respect to the image block 110 as a predicted motion vector PMV of the image block 111. As shown in FIG. 1(B), the size and direction of the predicted motion vector PMV are identical to those of the motion vector $MV_{110}$, except that a starting point of the predicted motion vector PMV is a center point of the image block 111 to be encoded. A predetermined region having a center point at an end of the predicted motion vector PMV is set as a search range S, which is then a search target in which the encoder searches for a reference block for the image block 111 to be encoded.

Different from the first improved solution of considering one single adjacent block, a second improved solution takes into account known motion vectors of multiple adjacent blocks. Refer to the example in FIG. 1(C). In this example, known motion vectors of four adjacent blocks 107 to 110 are taken into account. More specifically, in the second improved solution, the predicted motion vector PMV is caused to be equal to a median value of motion vectors $MV_{107}$ to $MV_{110}$, and the search range S is accordingly set. To better illustrate the relationship between the predicted motion vector PMV and the motion vectors $MV_{107}$ to $MV_{110}$, in FIG. 1(D), the motion vectors $MV_{107}$ to $MV_{110}$ are depicted as regarding the center point of the image block 111 to be encoded as a starting point. It is seen from FIG. 1(D) that, when correlation between the image block 111 to be encoded and the neighboring block 107 or 108 is higher (compared to the neighboring image blocks 109 and 110), the second improved solution is better than the first improved solution. In contrast, if the correlation between the image block 111 to be encoded and the neighboring image block 109 or 110 is higher, the second improved solution may not be able to determine a more ideal reference block.

SUMMARY OF THE INVENTION

The invention is directed to an image processing apparatus and an image processing method.

An image processing apparatus is provided according to an embodiment of the present invention. The image processing apparatus includes a search range providing circuit, a searching circuit and an encoder. The search range providing circuit provides N number of predicted motion vectors for a target image block, and accordingly sets N number of corresponding search ranges in a reference frame, where N is an integer greater than 1. The searching circuit performs a motion compensation searching process in the N number of search ranges to accordingly determine a motion vector for the target image block. The encoder encodes the target image block according to the motion vector.

An image processing method is provided according to another embodiment of the present invention. The method includes: obtaining N number of predicted motion vectors for a target image block, and accordingly setting N number of corresponding search ranges in a reference frame, where N is an integer greater than 1; performing a motion compensation searching process in the N number of search ranges to accordingly determine a motion vector for the target image block; and encoding the target image block according to the motion vector.

The above and other aspects of the invention will become better understood with regard to the following detailed description of the preferred but non-limiting embodiments. The following description is made with reference to the accompanying drawings.

Figure 1A:
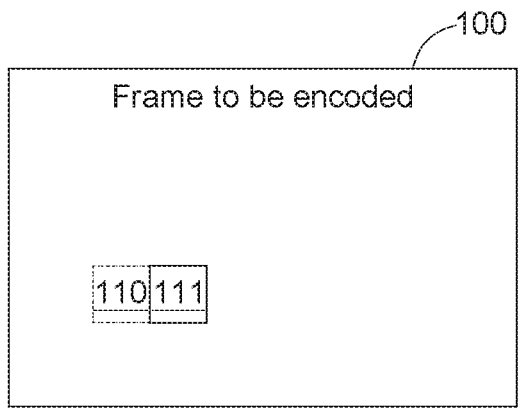
FIG. 1(A) to FIG. 1(D) (prior art) are examples of frames and image blocks for illustrating two conventional motion compensation solutions.
Figure 1B:
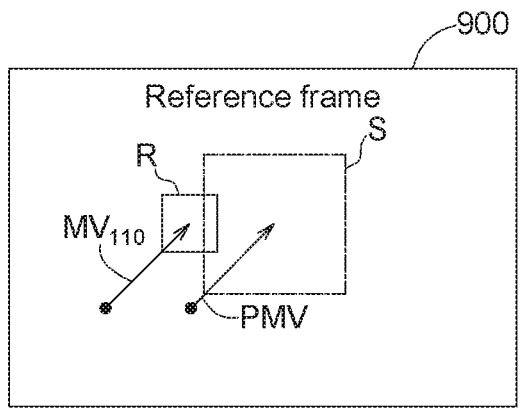
Figure 1C:
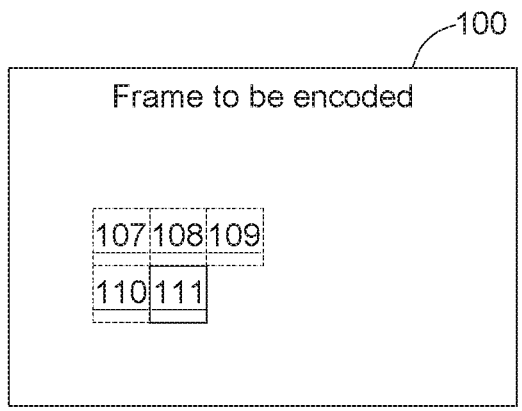
Figure 1D:
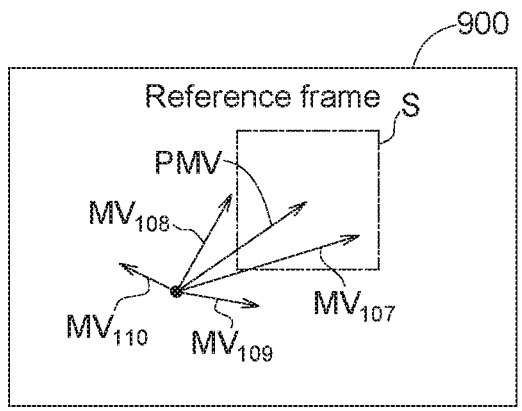

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 2A:
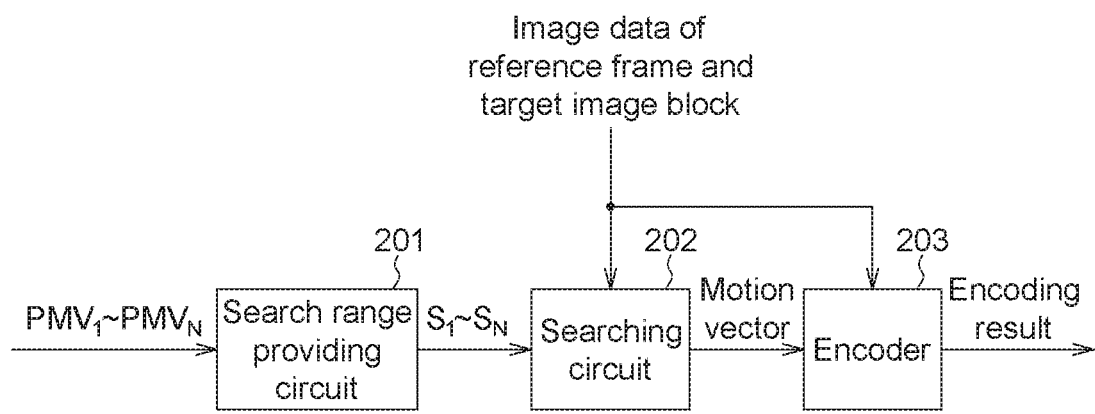
FIG. 2(A) is a function block diagram of an image processing apparatus according to an embodiment of the present invention.

FIG. 2(A) shows a function block diagram of an image processing apparatus according to an embodiment of the present invention. An image processing apparatus 200 includes a search range providing circuit 201, a searching circuit 202 and an encoder 203. In practice, the image processing apparatus 200 may be integrated into various electronic products needing the motion compensation technology for performing dynamic image encoding.

Figures 3A, 3B:
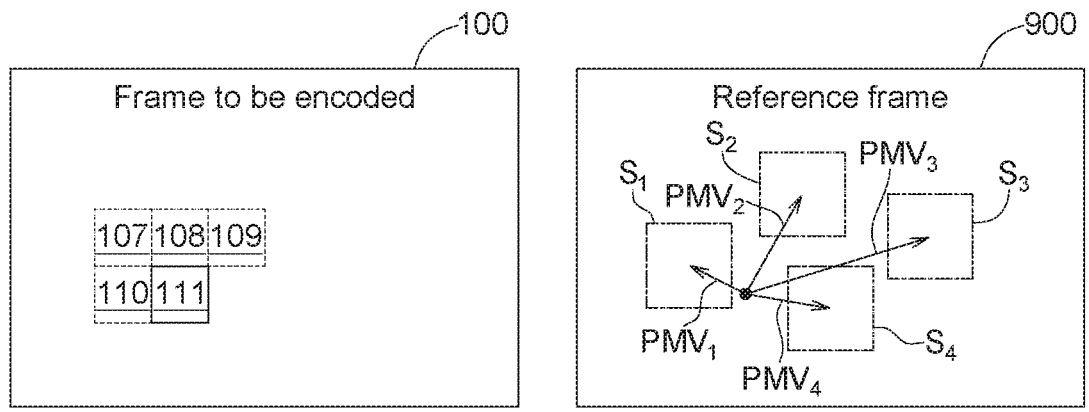
FIG. 3(A) and FIG. 3(B) are examples of frames and image blocks for illustrating a motion compensation solution associated with the present invention.

As previously described, an image block is a fundamental unit for encoding. The search range providing circuit 201 obtains N number of predicted motion vectors for an image block (to be referred to as a target image block) that needs to be encoded, where N is an integer greater than 1, and accordingly sets N number of corresponding search ranges $S_1$ to $S_N$ in a reference frame. For example, if motion vectors of N number of adjacent image blocks of the target image block are known, the N number of predicted motion vectors of the target image block may be the respective motion vectors of the N number of adjacent image blocks. It should be noted that, the so-called "adjacent" may be space-adjacent or time-adjacent. Image blocks 107 to 110 in FIG. 3(A) are space-adjacent image blocks of the target image block 111, and the image block of a previous reference frame is a time-adjacent image block of the target image block 111. In practice, the value N may be determined based on several factors, e.g., the number of hardware resources and the number of sets of obtainable data. The motion vectors of the adjacent image blocks may be determined by searching through the entire reference frame, or may be determined by a motion compensation searching process performed earlier by the searching circuit 202. Referring to the examples in FIG. 3(A) and FIG. 3(B), assuming that the target image block is the image block 111 and N is set to four, the search range providing circuit 201 relocates starting points of the respective motion vectors of the image blocks 107 to 110 to the center point of the image block 111, wherein the relocated motion vectors then serve as four predicted motion vectors (denoted by $PMV_1$ to $PMV_4$) of the image block 111, and the search range providing circuit 201 accordingly sets the four search ranges $S_1$ to $S_4$ in the reference frame 900.

In the example in FIG. 3(B), the search ranges $S_1$ to $S_4$ are respectively regions having predetermined sizes with ends of the predicted motion vectors $PMV_1$ to $PMV_4$ as centers thereof. It should be noted that, factors that determine characteristics of the search ranges $S_1$ to $S_4$ may include, for example but not limited to, the number of hardware resources, and the level of correlation between the adjacent image blocks and the target image block. In one embodiment, assume that the searching circuit 202 is provided with hardware resources for performing a motion compensation searching range on search ranges having a total area of 64*64 pixels in a predetermined working cycle, and N is set to four. Thus, the search range providing circuit 201 configures the sizes of the search ranges $S_1$ to $S_4$ to as 32*32 pixels. It should be noted that, the sizes and shapes of the N number of search ranges need not be completely identical. For example, compared to the image blocks 107 ad 109, the image blocks 108 and 110 are closer to the image block 111 and have higher spatial correlation with the image block 111; thus, while keeping the total search range area unchanged, the search range providing circuit 201 assigns larger search ranges (e.g., two areas each having 32*48 pixels) to the predicted motion vectors $PMV_2$ and $PMV_4$ and smaller search ranges (e.g., two areas each having 32*16 pixels) to the predicted motion vectors $PMV_1$ and $PMV_3$.

Figure 2B:
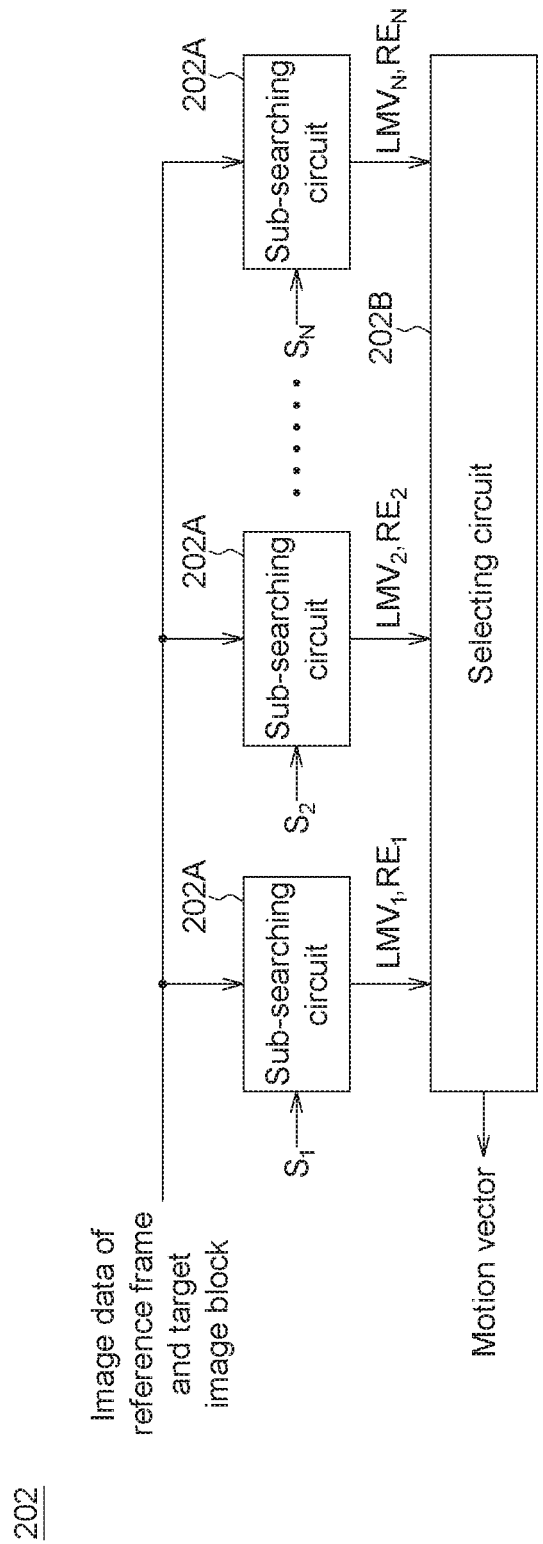
FIG. 2(B) is a function block diagram of a searching circuit according to an embodiment of the present invention.

Next, the searching circuit 202 performs a motion compensation searching process on the search ranges $S_1$ to $S_4$ 1, and accordingly determines a motion vector for the target image block. In other words, the searching circuit 202 evaluates all possible motion vectors in the search ranges $S_1$ to $S_4$ one after another to figure out a motion vector having a minimal residual data size therefrom. As shown in FIG. 2(B), the searching circuit 202 may be set to include N number of sub-searching circuits 202A and a selecting circuit 202B. The sub-searching circuits 202A may perform the motion compensation searching processes respectively on the search ranges $S_1$ to $S_4$, and determine respective regional motion vectors (denoted by $LMV_1$ to $LMV_N$) from the corresponding search ranges, in parallel. The selecting circuit 202B may select, according to the regional motion vectors $LMV_1$ to $LMV_N$ and the N number of residual data sizes (denoted by $RE_1$ to $RE_N$) corresponding to the target image data, the regional motion vector having the minimal residual data size as the motion vector outputted from the searching circuit 202.

The encoder 203 encodes the target image block according to the motion vector determined by the searching circuit 202, the image data of the reference frame and the image data of the target image block. It should be noted that, implementation details of encoding an image block according to an assigned motion vector are generally to known to one person skilled in the art, and shall be omitted herein.

One advantage of the image processing apparatus 200 is that, no matter what the correlation values are between the target image block and the adjacent blocks, all of the corresponding search ranges are searched. Given that the same amount of searching resources are used (e.g., when the total searching area is 64*64), while in the prior art one single predicted motion vector is used when performing a motion compensation searching process in one single search range, the image processing apparatus 200 is nonetheless able to determine a more ideal motion vector even if the search ranges of the predicted motion vectors $PMV_1$ to $PMV_N$ may be smaller.

Figure 4:
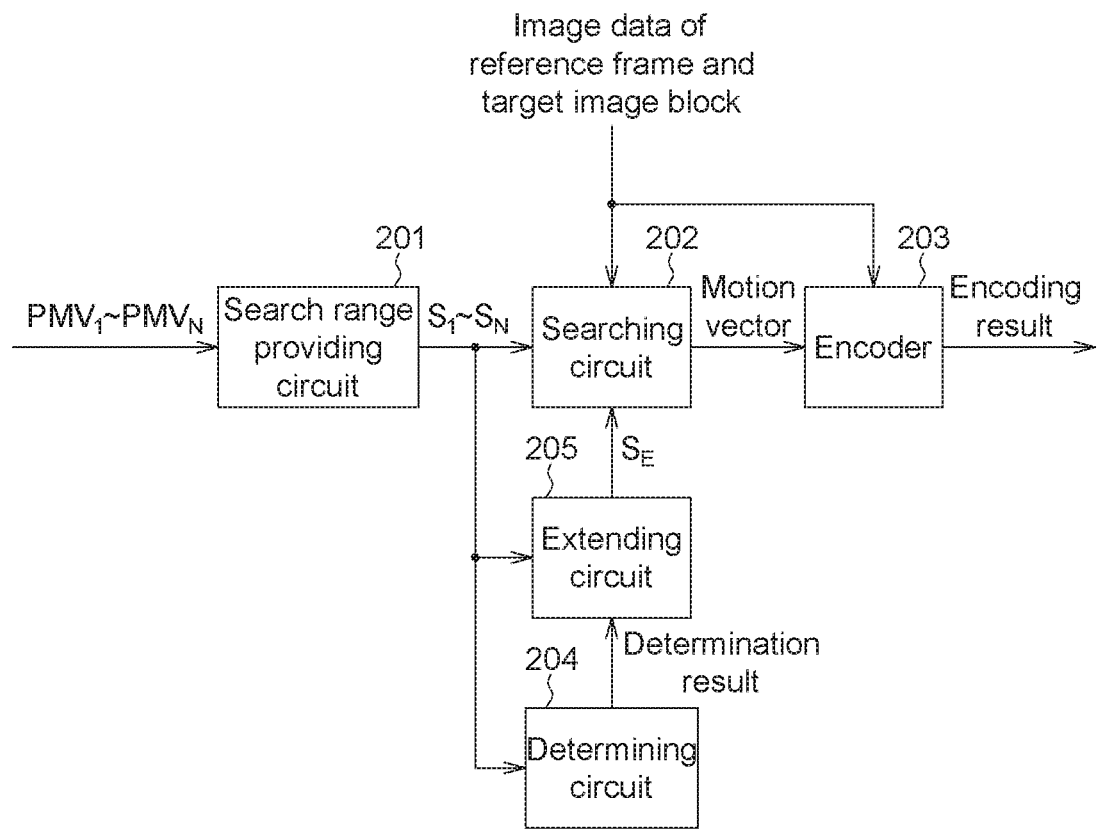
FIG. 4 is a function block diagram of an image processing apparatus according to another embodiment of the present invention.
Figure 5A:
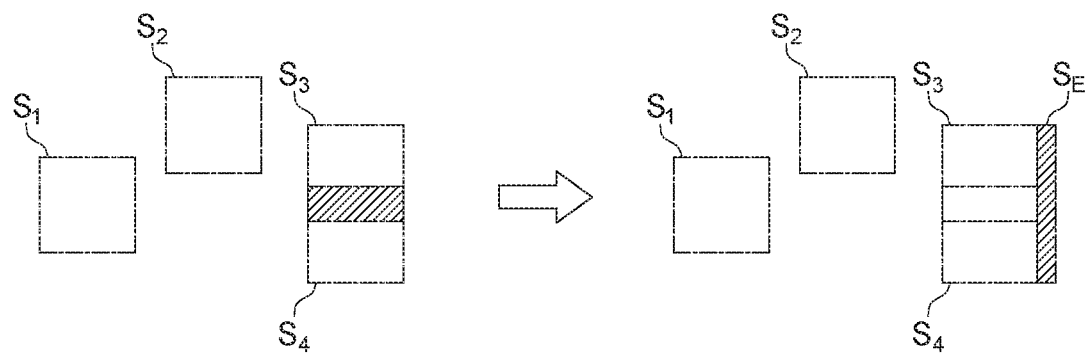
FIG. 5(A) to FIG. 5(C) are several extended examples of search ranges.
Figure 5B:
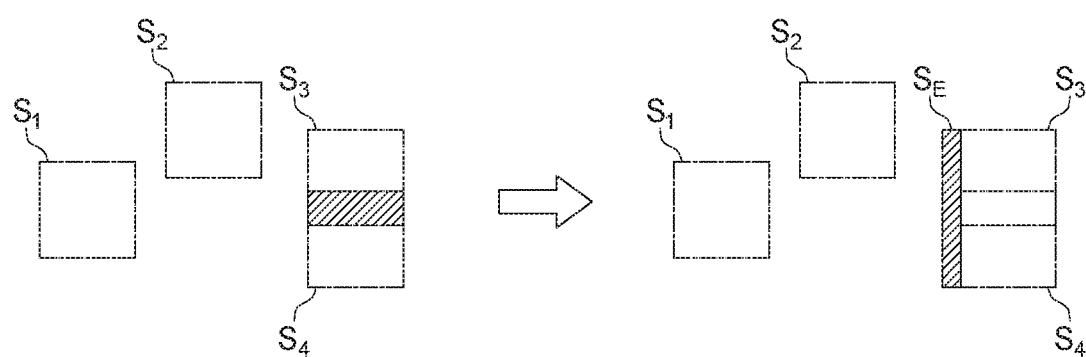
Figure 5C:
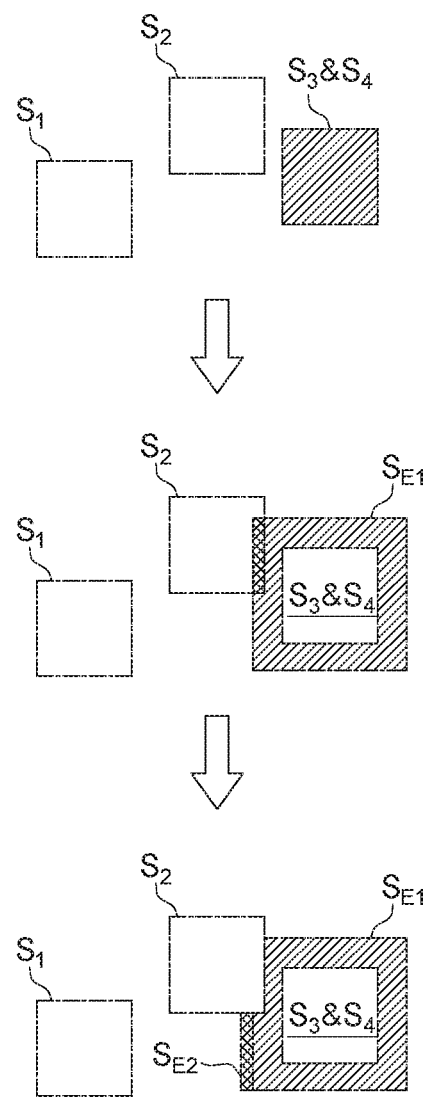

Refer to FIG. 4. In one embodiment, the image processing apparatus 200 further includes a determining circuit 204 and an extending circuit 205. The determining circuit 204 determines whether two or more search ranges among the search ranges $S_1$ to $S_4$ overlap. If the determination result of the determining circuit 204 is affirmative, the extending circuit 205 selects an extended search range $S_E$ that is non-overlapping with the search ranges $S_1$ to $S_4$, such that the searching circuit 202 also performs the motion compensation searching process on the extended search range $S_E$ in addition to the search ranges $S_1$ to $S_4$ when determining the motion vector. FIG. 5(A) to FIG. 5(C) show several examples of possible overlapping situations and the extended search ranges, with associated details given below.

Referring to the example in FIG. 5(A), as shown on the left side, the search ranges $S_3$ and $S_4$ provided by the search range providing circuit 201 partially overlap (represented by the shaded area). If the searching circuit 202 performs the motion compensation searching process individually on the search ranges $S_3$ and $S_4$, the overlapping region is searched twice, resulting in a waste in computation resources. Thus, when the determining circuit 204 determines that the search ranges $S_3$ and $S_4$ satisfy an overlapping condition, the extending circuit 205 selects an extended search range $S_E$ that does not overlap the search ranges $S_3$ and $S_4$, as shown on the right side of FIG. 5(A), and requests the searching circuit 202 to use the computation resources to search the extended search range $S_E$ when determining the motion vector. It should be noted that, the position and shape of the extended search range $S_E$ are not limited to the examples in FIG. 5(A). Factors that determine the characteristics (e.g., the position and shape) of the extended search range $S_E$ may include, for example but not limited to, a predetermined mode, positions and the correlations of the target image block with respect to the original adjacent image blocks. For example, the extended search range $S_E$ may be selected as being on the left side of the search ranges $S_3$ and $S_4$, as shown in FIG. 5(B). In another embodiment, when selecting the position of the extended search range $S_E$, the extending circuit 205 takes into account an area that has a higher probability of a better motion vector. For example, because the search ranges $S_1$ and $S_2$ are on the left side of the search ranges $S_3$ and $S_4$, the probability that a better motion vector appears on the left side of the search ranges $S_3$ and $S_4$ is higher than that on the right side of the search ranges $S_3$ and $S_4$. Thus, selecting the extended search range $S_E$ to be on the left side of the search ranges $S_3$ and $S_4$ is probably a better choice. On the other hand, compared to an irregular polygonal, the implementation of designing the shape of the extended search range $S_E$ to be a rectangle or a square is easier.

In the example in FIG. 5(C), the search ranges $S_3$ and $S_4$ provided by the search range providing circuit 201 are completely identical and completely overlapping (represented by a shaded area), and the extending circuit 205 first extends from the center point of the search range $S_3$ to form an extended search range $SE_1$. The determining circuit 204 may operate again to determine whether two or more search ranges among the search ranges $S_1$ to $S_N$ overlap the extended search range $SE_1$. As shown in FIG. 5(C), the extended search range $SE_1$ partially overlaps the search range $S_2$ (represented by a shaded area). Thus, the extending circuit 205 may further select an extended search range $SE_2$ as shown at the bottom of FIG. 5(C), and request the searching circuit 202 to perform the motion compensation searching process further on the extended search ranges $SE_1$ and $SE_2$ in addition to the search ranges $S_1$ to $S_4$ when determining the motion vector.

When some of the search ranges $S_1$ to $S_N$ overlap, the extending circuit 205 can make the total area of all extended search range $S_E$ to be equal to the total area of all overlapping regions, thus the amount of computation keeps unchanged. With respect to FIG. 5(A), the area of the extended search range $S_E$ is caused to be equal to the area of the overlapping region of the search ranges $S_3$ and $S_4$. With respect to FIG. 5(C), the total area of the extended search ranges $SE_1$ and $SE_2$ is caused to be equal to the area of the search range $S_3$.

In practice, when determining whether two or more search ranges among the searching ranges $S_1$ to $S_N$ overlap, in addition to determining according to the coverage of search ranges, the determining circuit 204 may further use the ends of the predicted motion vectors $PMV_1$ to $PMV_4$ as center point coordinates as the determination basis. More specifically, because the length and width of a search range are usually known, if the distance between two center point coordinates is smaller a predetermined threshold, the determining circuit 204 may determine that the two corresponding search ranges satisfies the overlapping condition. In practice, the determining circuit 204 and the extending circuit 205 may be implemented by various control and processing platforms, including fixed and programmable logic circuits, e.g., programmable logic gate arrays, application-specific integrated circuits, microcontrollers, microprocessors, and digital signal processors. Further, the determining circuit 204 and the extending circuit 205 may also be designed to complete respective tasks through executing a processor command stored in a memory (not shown).

Figure 6:
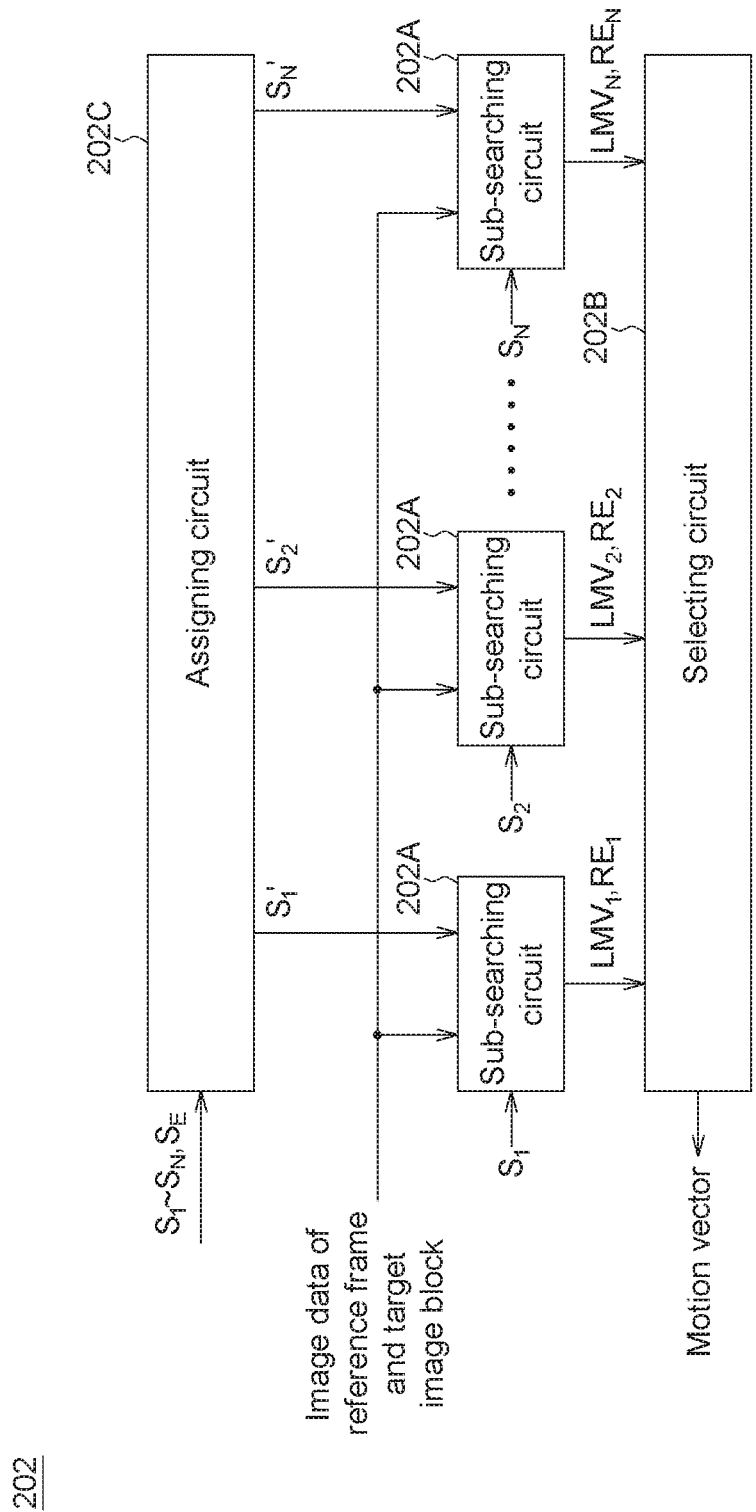
FIG. 6 is a function block diagram of a searching circuit according to another embodiment of the present invention.

Refer to FIG. 6. In one embodiment, in addition to the N number of sub-searching circuits 202A and the selecting circuit 202B in FIG. 2(B), the searching circuit 202 further includes an assigning circuit 202C. The assigning circuit 202C evenly divides the search ranges $S_1$ to $S_N$ and the extended search range $S_E$ into N number of non-overlapping parts (denoted by $S_1'$ to $S_N'$) according to area, and assigns $S_1'$ to $S_N'$ to the N number of sub-searching circuits 202A, which accordingly perform the motion compensation searching process in parallel.

Figure 7:
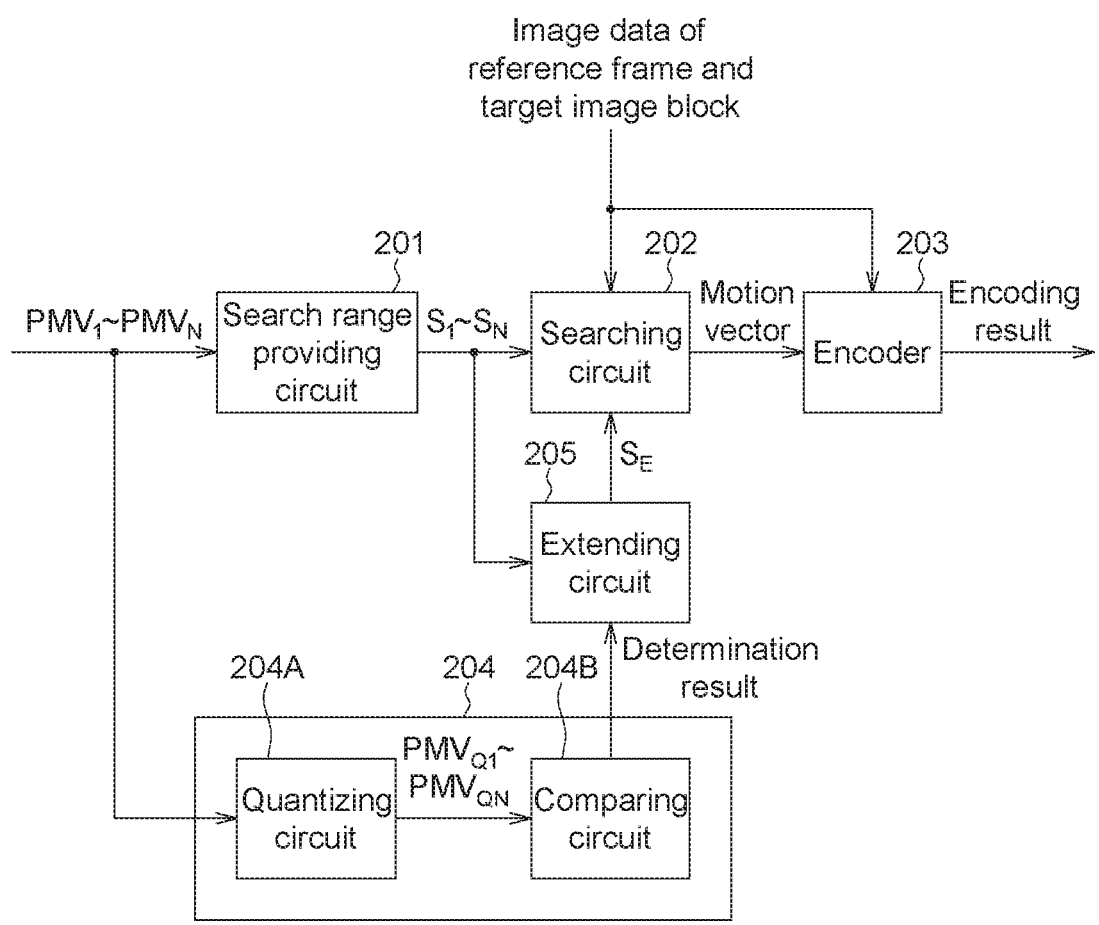
FIG. 7 is a function block diagram of an image processing apparatus according to an embodiment of the present invention.

Refer to FIG. 7. In one embodiment, the determining circuit 204 includes a quantizing circuit 204A and a comparing circuit 204B. The quantizing circuit 204A quantizes the predicted motion vectors $PMV_1$ to $PMV_4$ to generate quantized predicted motion vectors $PMV_{Q1}$ to $PMV_{QN}$. When the predicted motion vectors are represented by multiple binary or octave bits, this quantization process may be regarded as omitting the least significant bits and considering only the most significant bits. Provided that an appropriate quantization resolution is selected, two motion vectors having the same most significant bits means that the two search range are close enough to each other such that the two search ranges overlap. Thus, the comparing circuit 204B compares the quantized predicted motion vectors $PMV_{Q1}$ to $PMV_{QN}$. If there are M number of equal quantized predicted motion vectors (where M is an integer greater than 1), the comparing circuit 204B determines that the corresponding M number of search ranges satisfy the overlapping condition.

Figure 8:
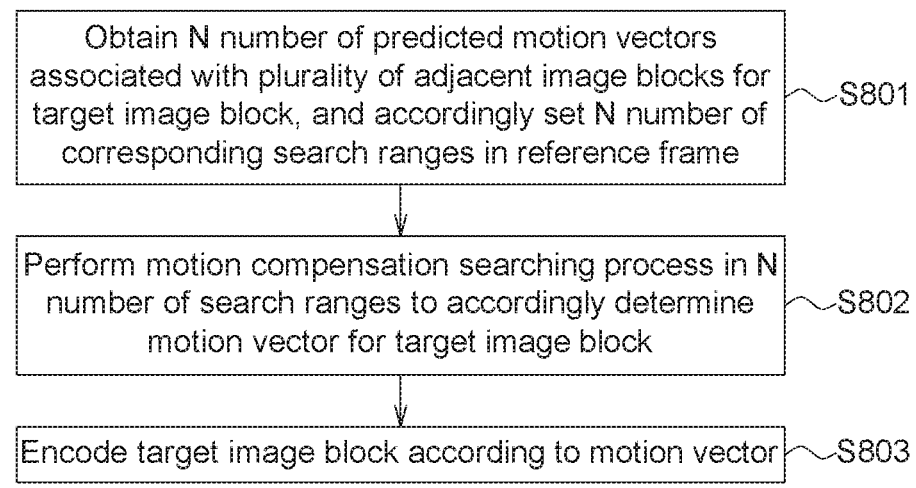
FIG. 8 is a flowchart of an image processing method according to an embodiment of the present invention.

FIG. 8 shows a flowchart of an image processing method according to an embodiment of the present invention. Referring to FIG. 8, in step S801, N number of predicted motion vectors are obtained for a target image block, and N number of corresponding search ranges are accordingly set in a reference frame, where N is an integer greater than 1. In step S802, a motion compensation searching process is performed on the N number of search ranges to accordingly determine a motion vector for the target image block. In step S803, the target image block is encoded according to the motion vector.

One person skilled in the art can understand that, operation variations in the description associated with the image processing apparatus 200 are applicable to the image processing method in FIG. 8, and shall be omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing apparatus, comprising:
   a search range providing circuit, obtaining N number of predicted motion vectors for a target image block, and accordingly setting N number of corresponding search ranges in a reference frame, where N is an integer greater than 1;
   a searching circuit, performing a motion compensation searching process individually on the N number of search ranges to accordingly determine a motion vector for the target image block; and
   an encoder, encoding the target image block according to the motion vector;
   a determining circuit, generating a determining result after determining whether two or more of the N number of search ranges satisfy an overlapping condition; and
   an extending circuit, if the determination result is affirmative, the extending circuit selecting an extended search range that does not overlap the N number of search ranges from the reference frame, and requesting the searching circuit to perform the motion compensation searching process further on the extended search range in addition to the N number of search ranges when determining the motion vector.

2. The image processing apparatus according to claim 1, wherein the N number of predicted motion vectors are respective motion vectors of N number of adjacent image blocks of the target image block.

3. The image processing apparatus according to claim 2, wherein the search range providing circuit determines respective characteristics of the N number of search ranges according to correlation between the N number of adjacent image blocks and the target image block.

4. The image processing apparatus according to claim 1, wherein, when two or more of the N number of search ranges have one or more overlapping regions, the extending circuit causes a total area of the extended search range to be equal to a total area of all overlapping regions of the N number of search ranges.

5. The image processing apparatus according to claim 4, wherein the extending circuit further determines characteristics of the extended search range according to correlations of the N number of adjacent image blocks and the target image block.

6. The image processing apparatus according to claim 1, wherein the searching circuit comprises:
   N number of sub-searching circuit, performing the motion compensation searching process in parallel; and
   an assigning circuit, dividing the N number of search ranges and the extended search range into N number of non-overlapping portions evenly according to total size of all the search ranges, and assigning the N number of non-overlapping portions to the N number of sub-searching circuits.

7. The image processing apparatus according to claim 1, wherein the determining circuit comprises:
   a quantizing circuit, quantizing the N number of predicted motion vectors to generate N number of quantized predicted motion vectors; and
   a comparing circuit, comparing the N number of quantized predicted motion vectors, and if there are M number of equal quantized predicted motion vectors, the comparing circuit determining that M number of corresponding search ranges satisfy the overlapping condition, where M is an integer greater than 1.

8. An image processing method, comprising:
   a) obtaining N number of predicted motion vectors for a target image block, and accordingly setting N number of corresponding search ranges in a reference frame, where N is an integer greater than 1;
   b) performing a motion compensation searching process individually on the N number of search ranges to accordingly determine a motion vector for the target image block; and
   c) encoding the target image block according to the motion vector;
   d) determining whether two or more of the N number of search ranges satisfy an overlapping condition;
   e) if a determination result of step (d) is affirmative, selecting an extended search range that does not overlap the N number of search ranges from the reference frame; and
   f) performing the motion compensation searching process further on the extended search range in addition to the N number of search ranges when determining the motion vector.

9. The image processing method according to claim 8, wherein the N number of predicted motion vectors are respective motion vectors of N number of adjacent image blocks of the target image block.

10. The image processing method according to claim 8, wherein step (e) comprises: when two or more of the N number of search ranges have one or more overlapping regions, causing a total area of the extended search range to be equal to a total area of all overlapping regions of the N number of search ranges.

11. The image processing method according to claim 8, wherein step (f) comprises:
    dividing the N number of search ranges and the extended search range into N number of non-overlapping portions evenly according to total size of all the search ranges, and performing the motion compensation searching process in parallel by using N number of sub-searching processes.

12. The image processing method according to claim 8, wherein step (d) comprises:
    quantizing the N number of predicted motion vectors to generate N number of quantized predicted motion vectors; and
    comparing the N number of quantized predicted motion vectors, and if there are M number of equal quantized predicted motion vectors, determining that M number of corresponding search ranges satisfy the overlapping condition, where M is an integer greater than 1.

\* \* \* \* \*